United States Patent
McNeilly

(10) Patent No.: US 8,359,935 B2
(45) Date of Patent: Jan. 29, 2013

(54) FIBER OPTIC ROTATION/POSITION SENSOR

(75) Inventor: Mike McNeilly, Gilbert, AZ (US)

(73) Assignee: Cleveland Electric Laboratories, Twinsburg, OH (US)

( * ) Notice: Subject to any disclaimer, the term of this patent is extended or adjusted under 35 U.S.C. 154(b) by 256 days.

(21) Appl. No.: 12/837,650

(22) Filed: Jul. 16, 2010

(65) Prior Publication Data

US 2011/0011188 A1     Jan. 20, 2011

Related U.S. Application Data

(60) Provisional application No. 61/226,081, filed on Jul. 16, 2009, provisional application No. 61/245,917, filed on Sep. 25, 2009.

(51) Int. Cl.
*G01L 1/22* (2006.01)
(52) U.S. Cl. .................................................. 73/862.045
(58) Field of Classification Search .......... 73/862.041–862.046
See application file for complete search history.

(56) References Cited

U.S. PATENT DOCUMENTS

| | | | |
|---|---|---|---|
| 3,576,302 A * | 4/1971 | Palfreyman | 244/236 |
| 4,293,814 A * | 10/1981 | Boyer | 324/166 |
| 4,767,164 A | 8/1988 | Yeung | |
| 5,397,891 A | 3/1995 | Udd et al. | |
| 5,649,035 A | 7/1997 | Zimmerman et al. | |
| 6,044,334 A * | 3/2000 | Joe et al. | 702/147 |
| 6,087,655 A | 7/2000 | Kobrin | |
| 6,244,644 B1 * | 6/2001 | Lovchik et al. | 294/111 |
| 6,329,897 B1 | 12/2001 | Osmer et al. | |
| 6,362,719 B1 | 3/2002 | Osmer et al. | |
| 6,486,767 B1 | 11/2002 | Rainey | |
| 6,768,750 B2 | 7/2004 | Kuksenkov | |
| 7,060,969 B2 * | 6/2006 | Uchiyama et al. | 250/231.16 |
| 7,148,962 B2 * | 12/2006 | Fuhrland et al. | 356/241.1 |
| 2006/0204164 A1 | 9/2006 | Ivtsenkov | |

* cited by examiner

*Primary Examiner* — Max Noori
(74) *Attorney, Agent, or Firm* — Roger Emerson; Emerson Thomson Bennett

(57) ABSTRACT

A sensor apparatus includes a resilient member positioned near a rod member and a strain sensor operatively connected to the resilient member. The rod member includes an eccentric member, which causes the resilient member to deflect as the rod member rotates. The strain sensor measures the strain in the resilient member due to the deflections caused by the eccentric member. The amount of strain relates to a rotational position of the rod member.

13 Claims, 12 Drawing Sheets

| SLOPES OF THE FUNCTIONS | FBG A | FBG B |
|---|---|---|
| 0-90 | + | - |
| 90-180 | - | - |
| 180-270 | - | + |
| 270-360 | + | + |

FIG. 12

FIBER OPTIC ROTATION/POSITION SENSOR

CROSS-REFERENCE TO RELATED APPLICATIONS

This application claims the benefit of U.S. Provisional Application No. 61/226,081, titled FIBER OPTIC ROTATION/POSITION SENSOR, filed Jul. 16, 2009, and U.S. Provisional Application No. 61/245,917, titled FIBER OPTIC ROTATION DISPLACEMENT SENSOR, filed Sep. 25, 2009, which are herein incorporated by reference.

I. BACKGROUND

A. Field of Invention

The present invention relates generally to determining the rotational position of a shaft and more specifically to using strain sensors to determine the rotational position or displacement of a shaft.

B. Description of the Related Art

It is well known in the art to use strain sensors to measure strain.

What is needed is a measurement device, which can determine the rotational position or displacement of a shaft using one or more strain sensors.

II. SUMMARY

According to one embodiment of this invention, a sensor apparatus includes a first resilient member positioned near a rod member, wherein the rod member includes a first eccentric member which causes the first resilient member to deflect as the rod member rotates; and a first strain sensor operatively connected to the first resilient member, wherein the first strain sensor measures the strain in the first resilient member due to the deflections caused by the first eccentric member, wherein the strain relates to a rotational position of the rod member. According to another embodiment, the sensor apparatus includes a second resilient member positioned near the rod member, wherein the first eccentric member causes the second resilient member to deflect as the rod member rotates; and a second strain sensor operatively connected to the second resilient member, wherein the second strain sensor measures the strain in the second resilient member due to the deflections caused by the first eccentric member, wherein the strain relates to a rotational position of the rod member. According to another embodiment, the second resilient member is positioned at about a 90° angle to the first resilient member.

According to another embodiment, the sensor apparatus may include a third resilient member positioned near the rod member, wherein the first eccentric member causes the third resilient member to deflect as the rod member rotates; and a third strain sensor operatively connected to the third resilient member, wherein the third strain sensor measures the strain in the third resilient member due to the deflections caused by the first eccentric member, wherein the strain relates to a rotational position of the rod member. According to another embodiment, the second resilient member is positioned at about a 60° angle to the first resilient member, and the third resilient member is positioned at about a 60° angle to the second resilient member. According to another embodiment, the second resilient member is positioned at about a 120° angle to the first resilient member, and the third resilient member is positioned at about a 120° angle to the second resilient member.

According to another embodiment, the sensor apparatus may include a fourth resilient member positioned near the rod member, wherein the first eccentric member causes the fourth resilient member to deflect as the rod member rotates; and a fourth strain sensor operatively connected to the fourth resilient member, wherein the fourth strain sensor measures the strain in the fourth resilient member due to the deflections caused by the first eccentric member, wherein the strain relates to a rotational position of the rod member.

According to another embodiment, the sensor apparatus includes a second resilient member subject to substantially the same temperature as the first resilient member; and a second strain sensor operatively connected to the second resilient member, wherein the second strain sensor measures the strain in the resilient member due changes in temperature.

According to another embodiment, the first strain sensor is a fiber Bragg grating operatively connected to a fiber Bragg grating interrogator device. According to another embodiment, the first resilient member is a spring. According to another embodiment, the first eccentric member is a cam. According to another embodiment, the rod member is crankshaft and the first eccentric member is a crankpin or crank journal. According to another embodiment, a first end of the first resilient member rotates with the crankpin and a second end of the first resilient member is fixed in relation to the crankshaft. According to another embodiment, the first eccentric member is a swash plate attached to the rod member. According to another embodiment, the first resilient element oscillates in a substantially linear direction parallel to the axial direction of the rod member.

According to another embodiment of this invention, a sensor apparatus includes a first resilient member positioned near a rod member, wherein the rod member includes a first eccentric member which causes the first resilient member to deflect as the rod member rotates; a first strain sensor operatively connected to the first resilient member, wherein the first strain sensor measures the strain in the first resilient member due to the deflections caused by the first eccentric member; a second resilient member positioned near the rod member, wherein the rod member includes a second eccentric member which causes the second resilient member to deflect as the rod member rotates, wherein the second eccentric member is located at a different position along the axial direction of the rod member than the first eccentric member, and the second eccentric member is offset from the first eccentric member in the circumferential direction by an angle; and a second strain sensor operatively connected to the second resilient member, wherein the second strain sensor measures the strain in the second resilient member due to the deflections caused by the second eccentric member; wherein the strain in the first resilient member and the strain in the second resilient member relate to a rotational position of the rod member.

According to another embodiment of this invention, the second eccentric member is offset from the first eccentric member in the circumferential direction by an angle greater than 0° and less than 180°. According to another embodiment of this invention, the second eccentric member is offset from the first eccentric member in the circumferential direction by an angle greater than 0° and less than or about equal to 90°. According to another embodiment of this invention, the second eccentric member is offset from the first eccentric member in the circumferential direction by an angle greater than 0° and less than or about equal to 45°.

According to another embodiment of this invention, a method of determining the rotational position includes the steps of converting a substantially rotational motion of a first member into a substantially oscillating motion of a second member; measuring the deflection in the second member caused by the oscillating motion; determining the rotational position of the first member based upon the deflection of the second member. According to another embodiment of this invention, the step of measuring further includes measuring the strain in the second member due to the deflection caused by the oscillating motion, and wherein the step of determining further comprises determining the rotational position of the first member based upon the measured strain in the second member.

One advantage of this invention is that the rotational position of a shaft can be accurately determined. Another advantage of this invention is the number of rotations of the shaft can be calculated. Another advantage is the direction of rotation of the shaft can be determined. Another advantage is the velocity and acceleration of the rotation can be determined.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 12 is the slope of the functions shown in FIG. 11.

IV. DETAILED DESCRIPTION OF THE INVENTION

Figure 1:
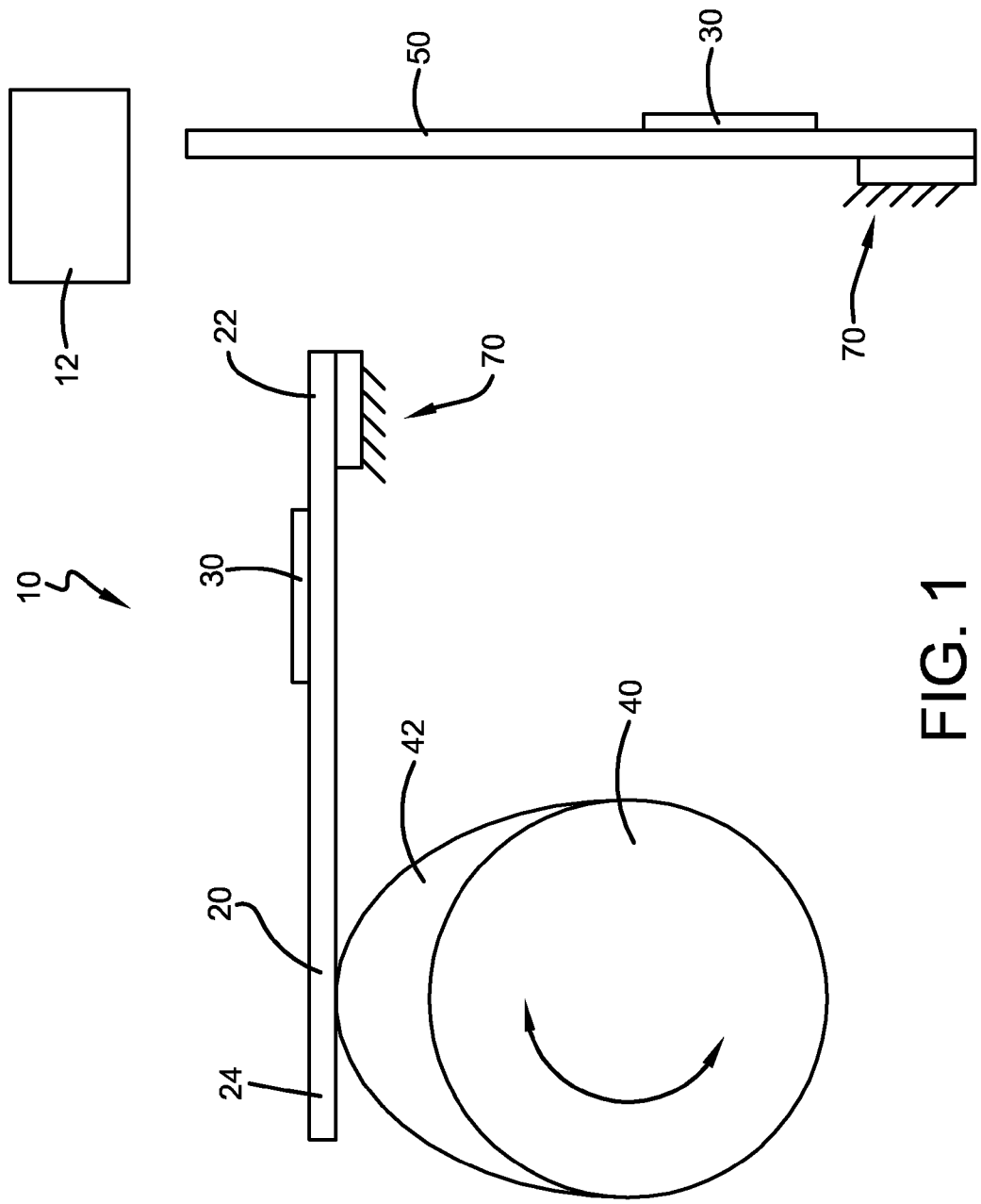
FIG. 1 is a perspective view of a fiber optic rotation position sensor, according to one embodiment.

Referring now to the drawings wherein the showings are for purposes of illustrating embodiments of the invention only and not for purposes of limiting the same, and wherein like reference numerals are understood to refer to like components, FIG. 1 shows a fiber optic rotation position sensor 10 including a resilient member 20 and a strain sensor 30 attached to the resilient member 20, according to one embodiment of this invention. The position sensor 10 is based upon the conversion of a substantially rotational motion to a substantially oscillating motion. The substantially oscillating motion is used to generate a variable level of strain in one or more strain sensors 30. The position sensor 10 can be used to measure motion, including but not limited to, linear, curvilinear, and rotational motion. The position sensor 10 can convert the substantially rotational motion into substantially linear motion. The resilient member 20 can be made of any resilient or elastic material chosen by a person of ordinary skill in the art. In some embodiments, the resilient member 20 is a spring. The resilient member 20 can be any type of spring chosen by a person of ordinary skill in the art including, but not limited to, a helical spring, a coil spring, a torsion spring, a tension/extension spring, a flat spring, a cantilever spring, and a leaf spring. The spring 20 can be made of a metallic compound, metal, plastic, rubber, or wood. The spring 20 can be a pneumatic or compressible fluid or gas type element. The resilient member 20 can be fixed or attached near one end 22 to an attachment location 70. The strain sensor 30 can be any type of strain sensor or gauge chosen by a person of ordinary skill in the art. The strain sensor generates a signal based upon the amount of strain measured, as is well known in the art. In some embodiments, the strain sensor 30 is a fiber Bragg grating (FBG). The fiber Bragg grating 30 can be connected to a fiber Bragg grating interrogator apparatus or system 12 with an optical fiber or other means, as is well known in the art. The strain sensor 30 may be any type of fiber Bragg grating having any grating structure chosen by a person of ordinary skill in the art.

The rotational displacement sensor 10 can be positioned adjacent a rod, tube, pipe, or shaft 40, which includes an eccentric member. In some embodiments, the eccentric member is a cam 42. A rack and gear, an arm, a pulley, or any other method chosen with ordinary skill in the art can be used to convert linear motion into rotational motion for the shaft 40. As the shaft 40 rotates, the cam 42 contacts the resilient member 20 and causes the resilient member 20 to deflect. The cam 42 can contact the resilient member 20 near a second end 24. The strain sensor 30 measures strain caused by the deflection of the resilient member 20. The strain measured by the strain sensor 30 can relate to a position of the cam 42, which relates to a rotational position of the shaft 40. The position sensor 10 may include a resilient member 50 located near the resilient member 20 but not in contact with the shaft 40 or cam 42. The resilient member 50 and the resilient member 20 can be made of the same or similar material. The resilient member 50 may include a strain sensor 30 for temperature compensation of the strain sensor 30 attached to the resilient member 20. The resilient member 20 and the resilient member 50 are subject to the same temperature, which allows the accurate temperature compensation of the strain sensor 30 attached to the resilient member 20. Instead of using the resilient member 50 for temperature compensation, other apparatus and methods can be used including, but not limited to, thermocouples, resistance temperature detectors, thermistor, and fiber Bragg grating temperature sensors. In some embodiments, the position sensor 10 does not use a separate resilient member 20, but instead can use an fiber Bragg grating cable assembly as the resilient member.

Figure 2:
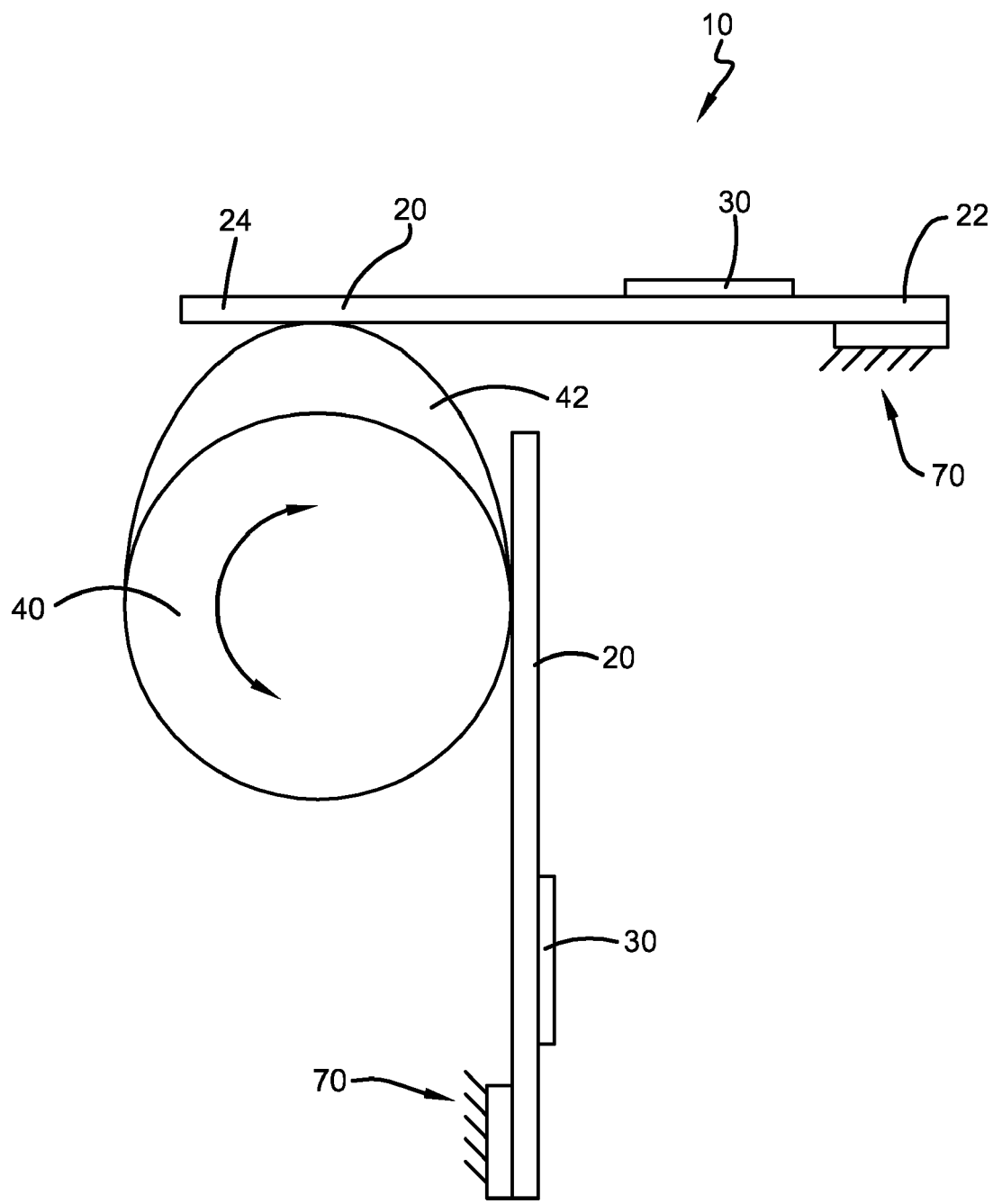
FIG. 2 is a perspective view of a fiber optic rotation position sensor, according to one embodiment.
Figure 3:
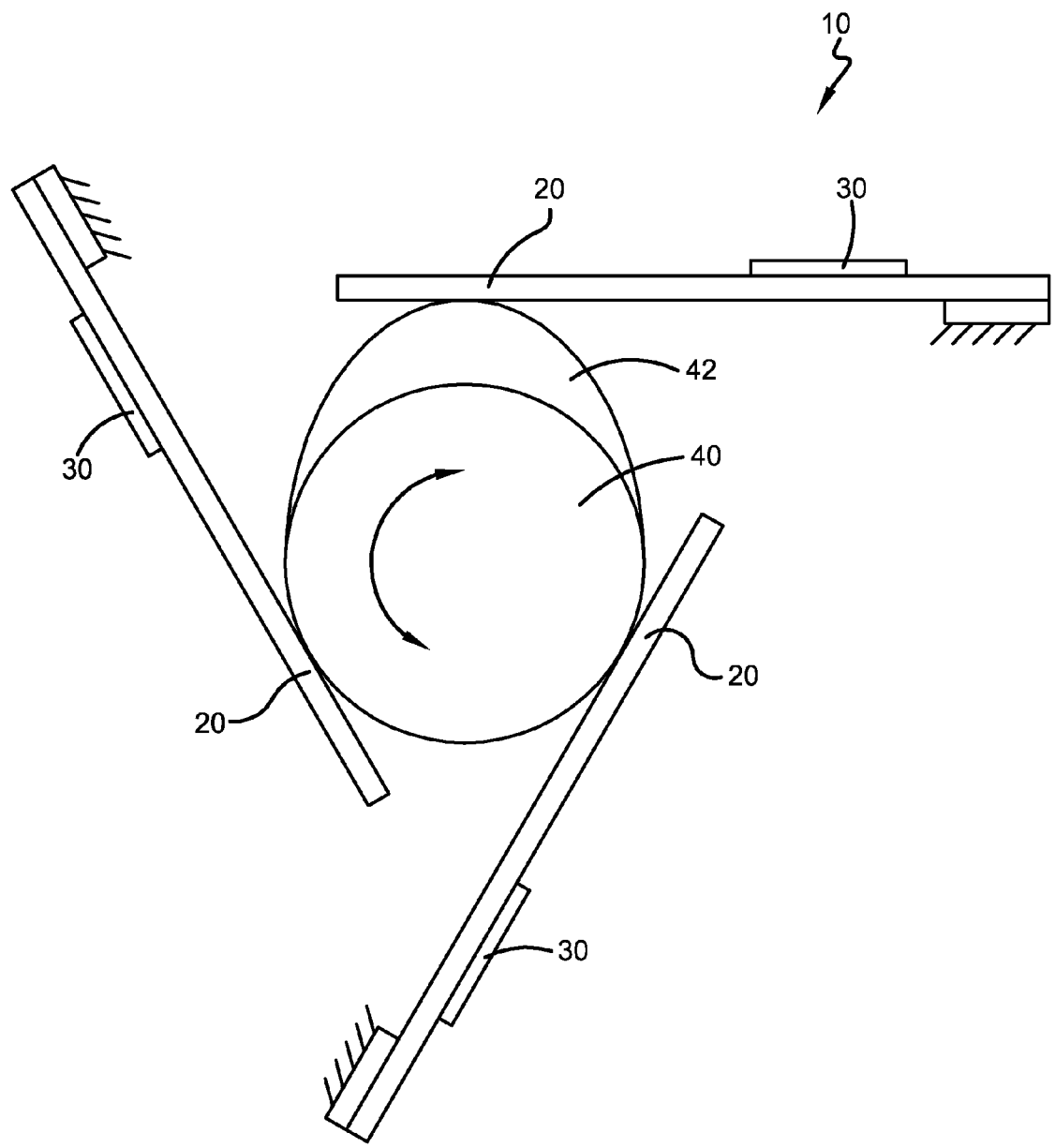
FIG. 3 is a perspective view of a fiber optic rotation position sensor, according to one embodiment.
Figure 4:
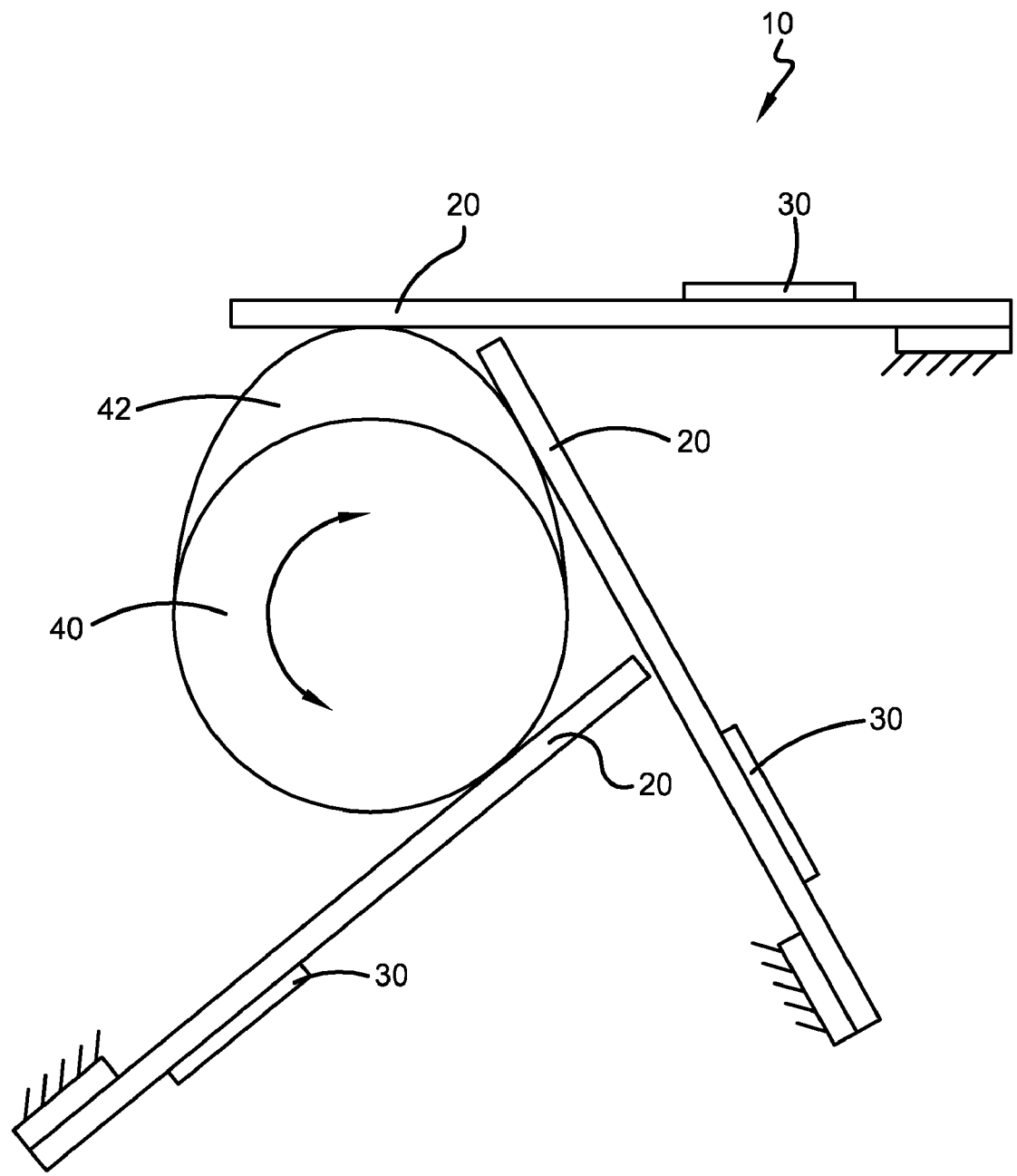
FIG. 4 is a perspective view of a fiber optic rotation position sensor, according to one embodiment.
Figure 5:
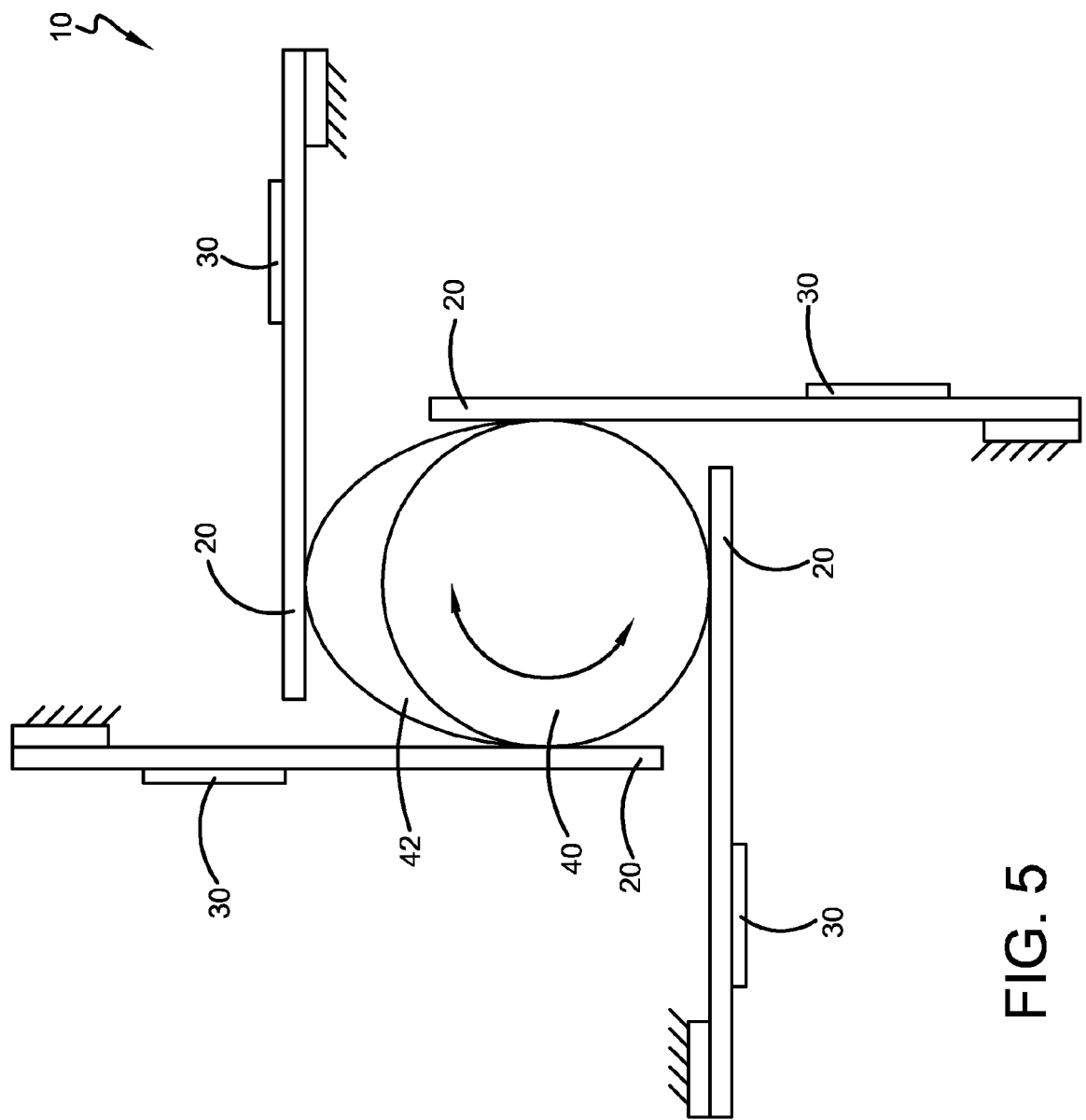
FIG. 5 is a perspective view of a fiber optic rotation position sensor, according to one embodiment.

With reference now to FIGS. 2-5, the position sensor 10 may include multiple resilient members 20, each including an strain sensor 30, mounted at different angular locations. Each resilient member 20 deflects as the cam 42 rotates and contacts each resilient member 20. In one embodiment, the position sensor 10 includes two resilient members 20, 20 positioned at substantially 90° to each other, as shown in FIG. 2. The two resilient members 20, 20 could also be positioned substantially parallel to each other at substantially opposite sides of the shaft 40. In another embodiment, the position sensor 10 includes three resilient members 20, 20, 20 positioned at substantially 60° to each other, as shown in FIG. 3. The three resilient members 20, 20, 20 could also be positioned in many different triangular and non-triangular configurations with the same or different angles to each other. For one non-limiting example, the three resilient members 20, 20, 20 are located within about 120° of rotation of the shaft 40, as shown in FIG. 4. In another embodiment, the position sensor 10 includes four resilient members 20, 20, 20, 20 positioned at substantially 90° to each other forming a substantially rectangular or square shape around the circumference of the shaft 40. The four resilient members 20, 20, 20, 20 could also be positioned in many different configurations with many different angles to each other.

Many other configurations using two or more resilient members have been contemplated and are within the scope of this invention. The resilient members can have the same or different angles in relation to each other. The resilient members can be positioned so that the cam is in contact with at least one resilient member throughout the entire 360° of rotation. For temperature compensation when two or more strain sensors are used, strain readings can be compared between two strain sensors, each located on a different resilient member. By comparing the strain readings between two strain sensors, the strain developed due to thermal expansion or contraction can be calculated.

Figure 6:
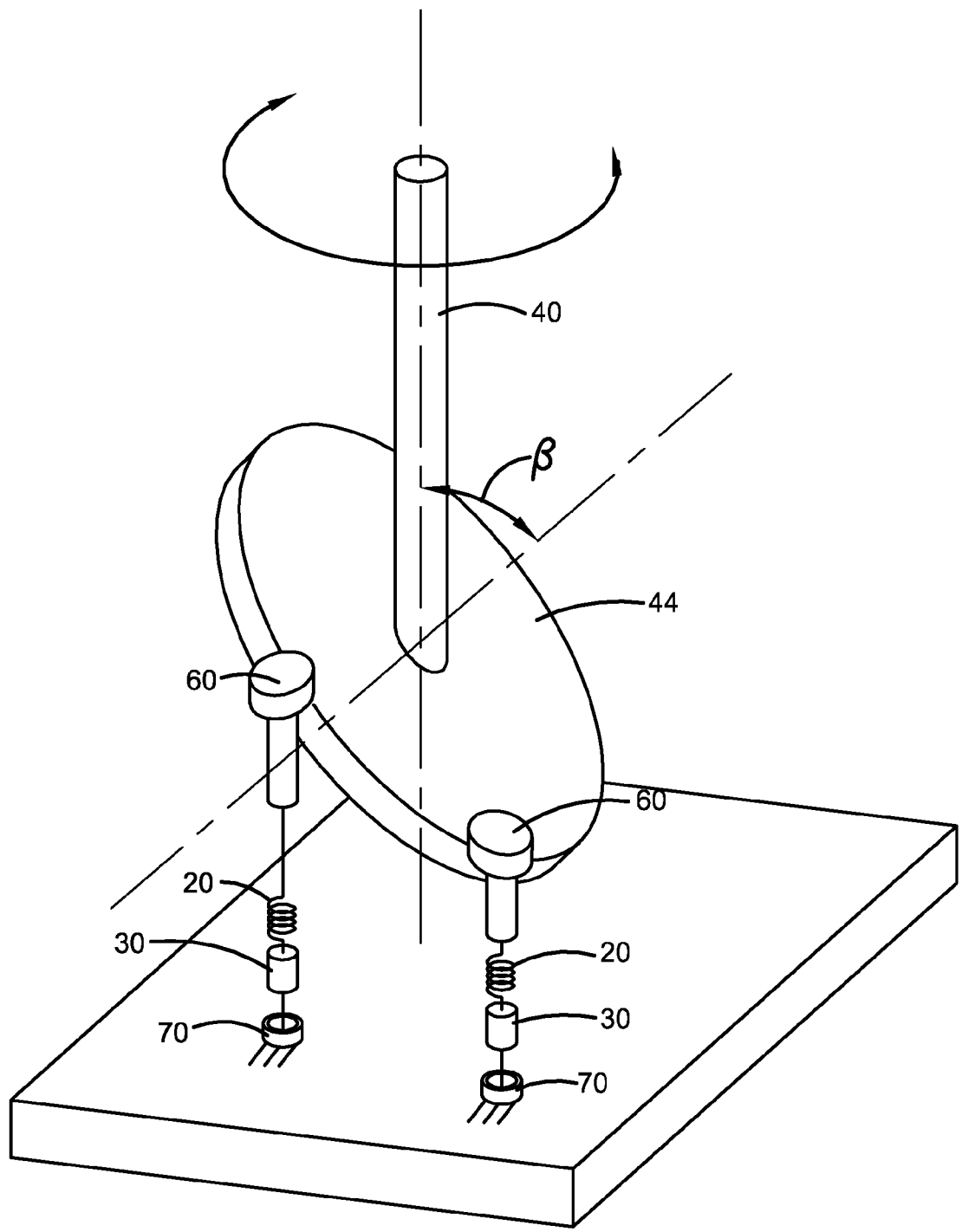
FIG. 6 is a perspective view of a fiber optic rotation position sensor, according to one embodiment.

With reference now to FIG. 6, the position sensor 10 may include one or more resilient members 20, each including a fiber Bragg grating 30, and one or more bearing or cam followers 60. The resilient member 20 can be fixed or attached at one end 22 to an attachment location 70 and connected at the other end 24 to the bearing follower 60. The strain sensor 30 can be located between the end 22 of the resilient member 20 and the attachment location 70. The position sensor 10 can be positioned adjacent a shaft 40 including an eccentric member. In some embodiments, the eccentric member is a swash plate 44 and the bearing follower 60 contacts the swash plate 44. The swash plate 44 can be substantially cylindrical and the center of the swash plate 44 can be attached to the shaft 40. The axial direction or longitudinal axis of the swash plate 44 can be offset at an angle β from the axial direction or rotational axis of the shaft. In one embodiment, the angle β is greater than 0° and less than 90°. This offset causes the swash plate 44 to oscillate in the axial direction of the shaft 40. As the shaft 40 and swash plate 44 rotate, the bearing follower 60 moves in a substantially linear motion in substantially the same direction as the axial direction or longitudinal axis of the shaft 40. The resilient member 20 provides an increasing or decreasing load on the strain sensor 30 as the bearing follower 60 moves. The strain sensor 30 functions as a strain indicator, which is calibrated to relate the amount of strain to an angular orientation of the shaft. This relation allows the angular displacement of the shaft to be determined.

When the shaft 40 rotates, the deflections, and therefore the strain levels, in the two resilient members 20, 20 change due to the position of the bearing followers 60 on the swash plate 44. The deflection in the first resilient member 20 is different from the deflection in the second resilient member 20 at every location in the rotation of the shaft 40. The deflection is different because each of the resilient members 20 is located at a different position on the swash plate 44. Thus, the output from the first strain sensor 30, located on the first resilient member 20, is different from the output from the second strain sensor 30, located on the second resilient member 20, at every position in the rotation of the shaft 40. Combining or comparing the output from the two strain sensor 30 generates a specific and distinct output pattern at every position in the rotation of the shaft 40.

Figure 7:
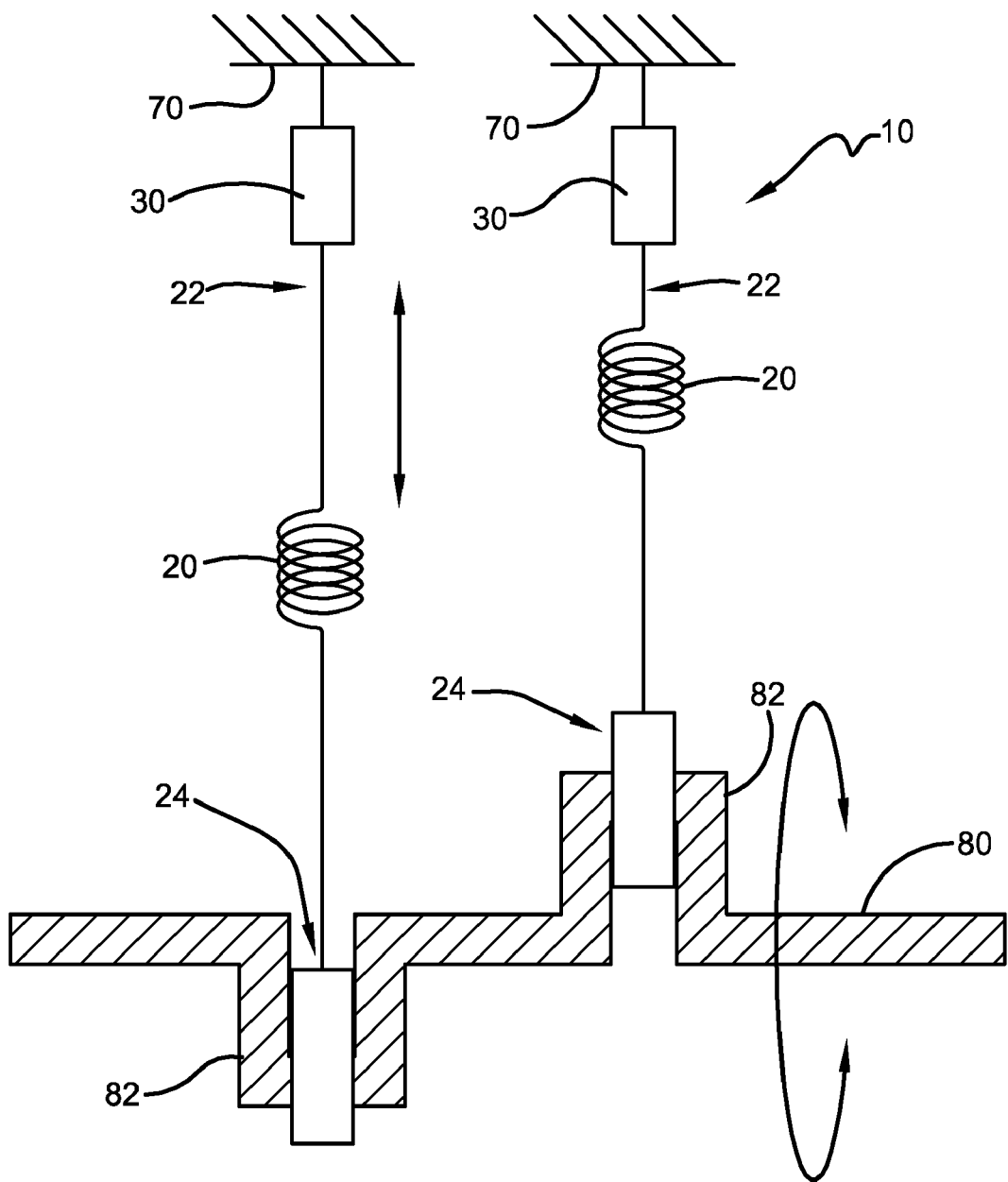
FIG. 7 is a perspective view of a fiber optic rotation position sensor, according to one embodiment.

With reference now to FIG. 7, the position sensor 10 may include one or more resilient members 20, each including a fiber Bragg grating 30. The resilient member 20 can be fixed or attached at one end 22 to an attachment location 70. The strain sensor 30 can be located between the end 22 of the resilient member 20 and the attachment location 70. The position sensor 10 can be positioned adjacent a crankshaft 80 including one or more crankpins or crank journals 82 with the resilient member 20 connected to the crankpin 82. When the crankshaft 80 and crankpin 82 rotate, an end 24 of the resilient member 20 rotates with the crankpin 82, and the resilient member 20 expands and contracts providing an increasing or decreasing load on the strain sensor 30. The strain sensor 30 is calibrated to relate the amount of strain to the angular orientation of the shaft, which allows the angular displacement of the shaft to be measured.

Figure 9:
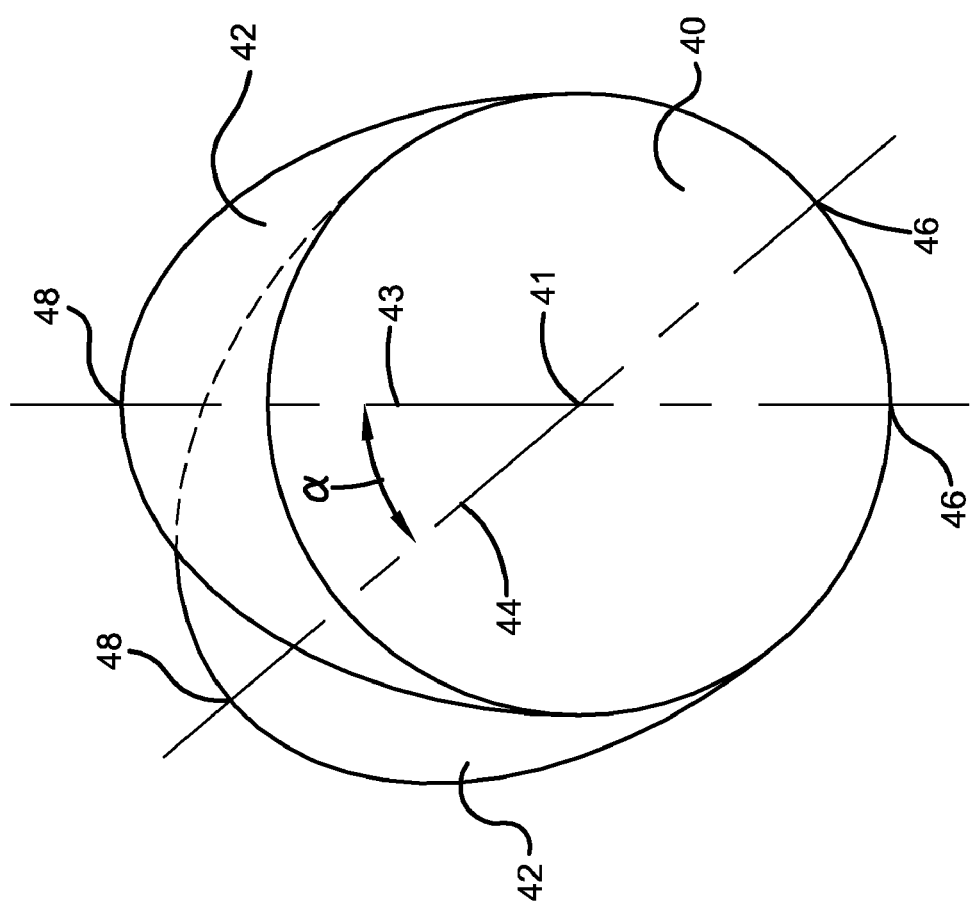
FIG. 9 is an end view of a shaft showing the offset angle in the circumferential direction between two cams or crankpins, according to one embodiment.

When the crankshaft 80 rotates, the deflections, and therefore the strain levels, in the two resilient members 20, 20 change due to the shape and configuration of each of the crankpins 82. The deflection in the first resilient member 20 is different from the deflection in the second resilient member 20 at every location in the rotation of the crankshaft 80. The deflections are different because each of the resilient members 20 is located on a different crankpin 82, which are offset by angle α in the circumferential direction, as shown in FIG. 9. In one embodiment, the angle α is greater than 0°, and less than 180°. Thus, the output from the first strain sensor 30, located on the first resilient member 20, is different from the output from the second strain sensor 30, located on the second resilient member 20, at every position in the rotation of the crankshaft 80. Combining or comparing the output from each of the strain sensors 30 generates a specific and distinct output pattern at every position in the rotation of the crankshaft 80.

Figure 8:
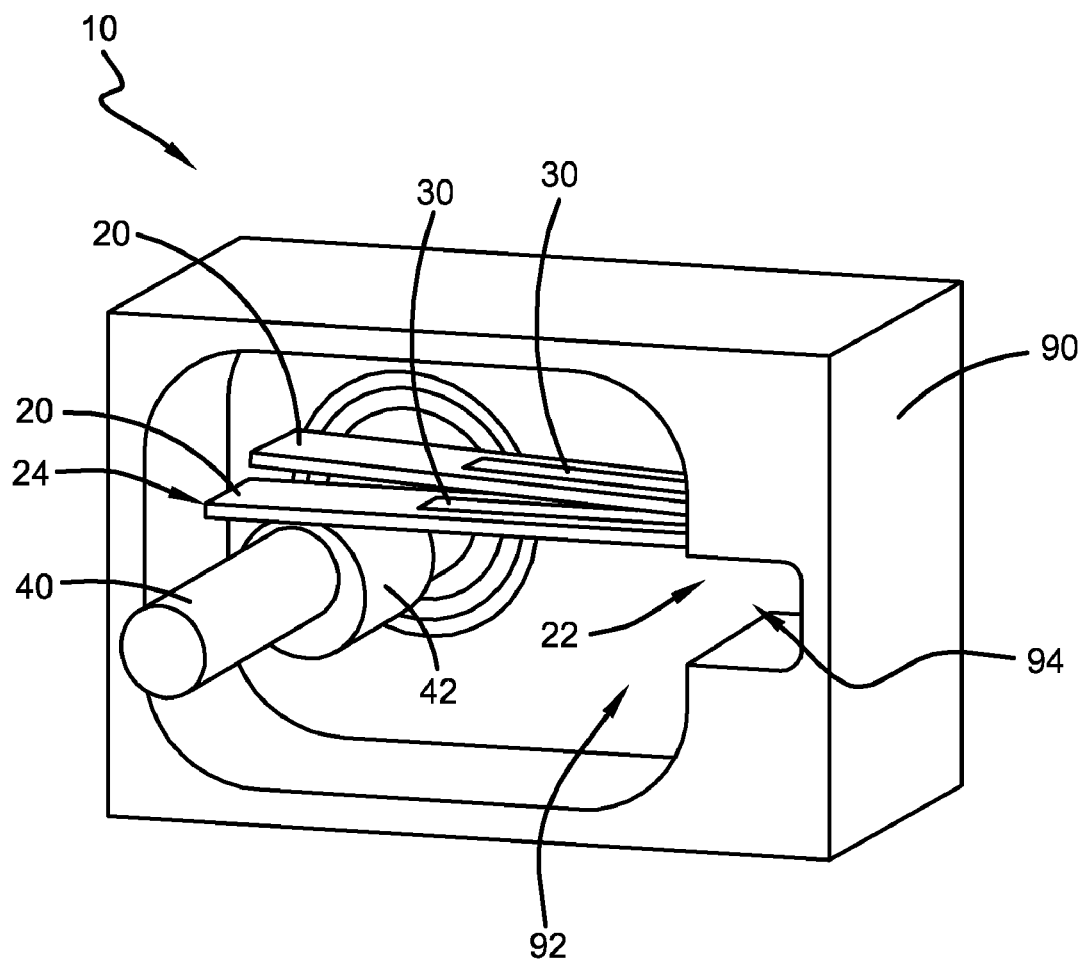
FIG. 8 is a perspective view of a fiber optic rotation position sensor, according to one embodiment.
Figure 10:
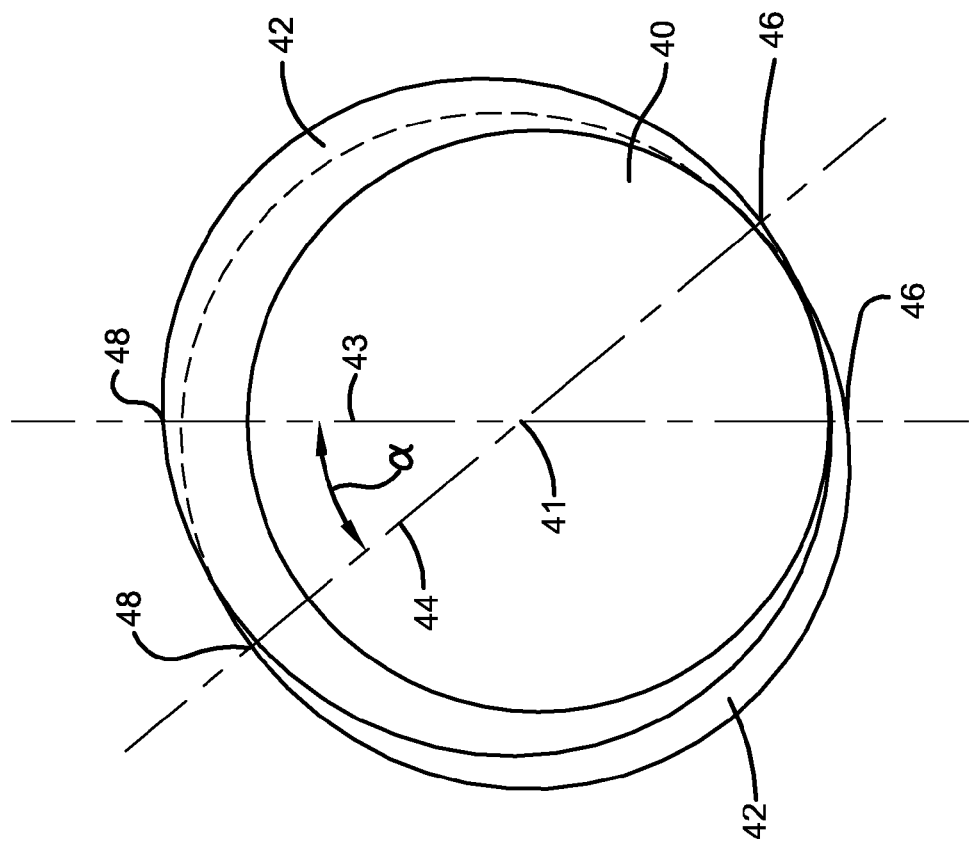
FIG. 10 is an end view of a shaft showing the offset angle in the circumferential direction between two cams or crankpins, according to one embodiment.

With reference now to FIGS. 8-10, the position sensor 10 may include one or more resilient members 20, each including a strain sensor 30. The strain sensor can be mounted on the surface of the resilient member 20 by any means chosen by a person of ordinary skill in the art. The resilient member 20 can be fixed or attached at one end 22 to a housing 90. The housing 90 may be formed of any material chosen by a person of ordinary skill in the art. The housing 90 may include a recess 92 and an indent 94, which receives one end 22 of each of the resilient members 20. The position sensor 10 can be positioned adjacent a shaft 40, which includes one or more cams 42. The shaft 40 can be rotationally connected to the housing 90. As the shaft 40 rotates, the cam 42 contacts the resilient member 20 and causes the resilient member 20 to deflect. The cam 42 can contact the resilient member 20 near a second end 24. The two resilient members 20, 20 may be installed in the housing 90 in a substantially side-by-side configuration. The cams 42, 42 can be positioned on the shaft 40 adjacent to each other or spaced apart along the axial direction or longitudinal axis of the shaft 40. The resilient members 20, 20 may be formed of any material chosen by a person of ordinary skill in the art. Any number of cams and resilient members is contemplated with each resilient member in contact with a cam.

With reference to FIGS. 9 and 10, the profile of the cams 42, 42 can be circular, eccentric, pear-shaped, cylindrical, plate, or any other shape chosen by a person of ordinary skill in the art. Each cam 42 includes a minimum lift point 46 and a maximum lift point 48. The profiles of the two cams 42, 42 can be offset by an angle α. The angle α is defined as the angle between a line 43 passing through the center 41 of the shaft 40 and the maximum lift point 48 of the first cam 42, and a line 44 passing through the center 41 of the shaft 40 and the maximum lift point 48 of the second cam 42.

The angle α can be any angle greater than 0°. In one embodiment, the angle α is greater than 0°, and less than or equal to about 180°. In another embodiment, the angle α is greater than 0°, and less than or equal to about 165°. In another embodiment, the angle α is greater than 0°, and less than or equal to about 150°. In another embodiment, the angle α is greater than 0°, and less than or equal to about 135°. In another embodiment, the angle α is greater than 0°, and less than or equal to about 120°. In another embodiment, the angle α is greater than 0°, and less than or equal to about 105°.

In another embodiment, the angle α is greater than 0°, and less than or equal to about 90°. In another embodiment, the angle α is greater than 0°, and less than or equal to about 60°. In another embodiment, the angle α is greater than 0°, and less than or equal to about 45°. In another embodiment, the angle α is greater than 0°, and less than or equal to about 30°. In another embodiment, the angle α is greater than 0°, and less than or equal to about 20°. In another embodiment, the angle α is greater than 0°, and less than or equal to about 15°. In another embodiment, the angle α is greater than 0°, and less than or equal to about 10°. In another embodiment, the angle α is greater than 0°, and less than or equal to about 5°.

In another embodiment, the angle α is greater than or equal to about 5°, and less than or equal to about 45°. In another embodiment, the angle α is greater than or equal to about 5°, and less than or equal to about 30°. In another embodiment, the angle α is greater than or equal to about 5°, and less than or equal to about 20°. In another embodiment, the angle α is greater than or equal to about 5°, and less than or equal to about 15°. In another embodiment, the angle α is greater than or equal to about 5°, and less than or equal to about 10°.

With continuing reference to FIGS. 8-10, a first resilient member 20 may contact a first cam 42, and a second resilient member 20 may contact a second cam 42. When the shaft 20 rotates, the deflection, and therefore the strain level, in each resilient member 20 changes due to the shape and lift of each of the cams 42, 42. The deflection, and the strain level, in the first resilient member 20 is different than the deflection, and the strain level, in the second resilient member 20 at every location in the rotation of the shaft 40. The deflection, and the strain level, is different because each of the resilient members 20 is located on a different cam 42, which are offset by angle α. Thus, the output from the first strain sensor 30, which is located on the first resilient member 20, is different than the output from the second strain sensor 30, which is located on the second resilient member 20, at every location in the rotation of the shaft 40. Combining or comparing the output from each of the strain sensors 30 generates a specific and distinct output pattern at every location in the rotation of the shaft 40.

In contrast, when only one cam 42 and one resilient member 20 are used, the resilient member only has unique deflections, and strain levels, at the maximum lift point 48 and the minimum lift point 46 of the cam 42. At all other locations in the rotation of the shaft 40, the deflection of the shaft 40 would correspond to two different locations on the cam 42. Thus, including the second resilient member 40, with the second strain sensor 30, in contact with the second cam 42, which is offset from the first cam 42, gives every location in the full rotation of the shaft a unique and measurable output pattern.

Figure 11:
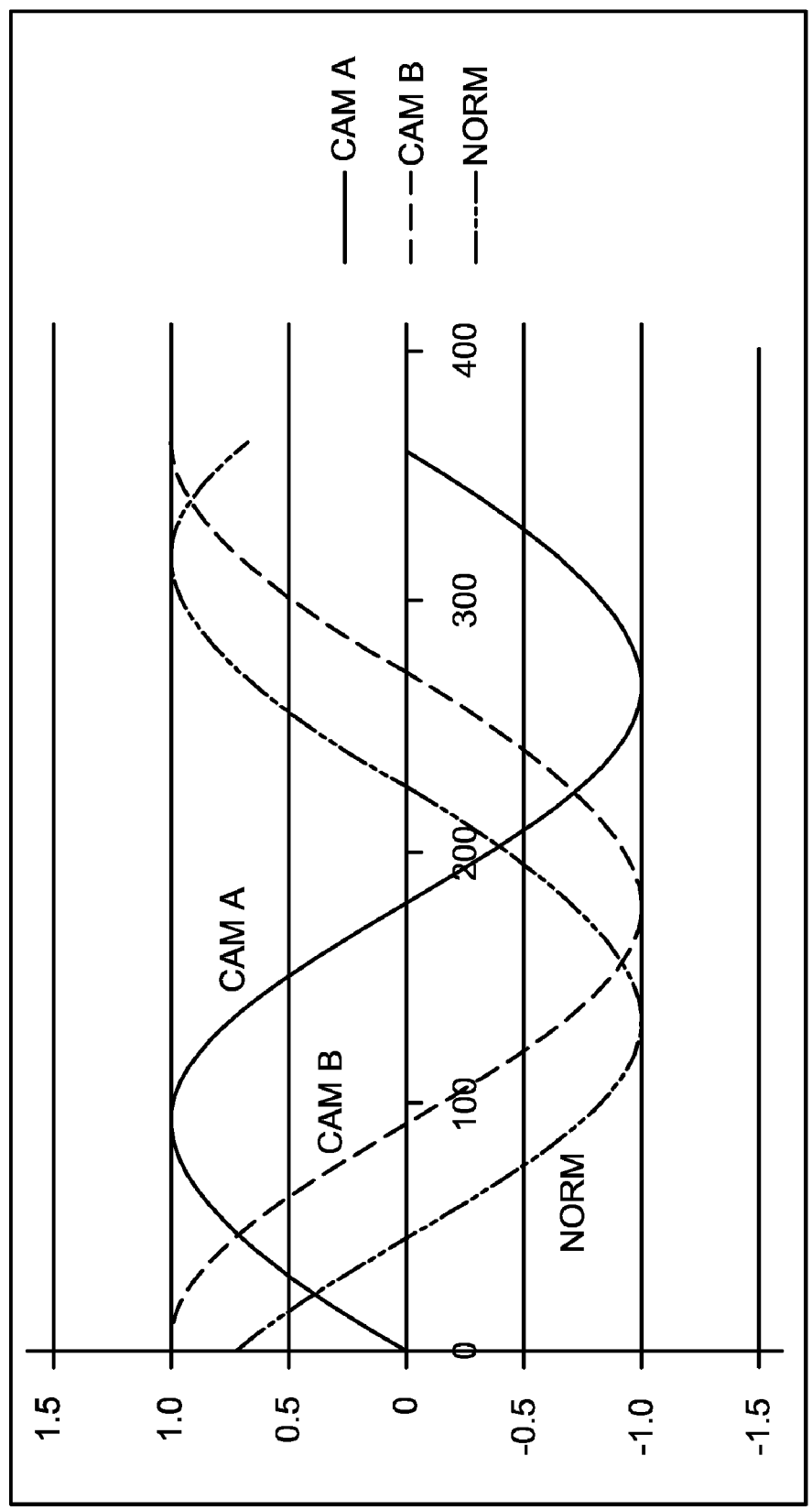
FIG. 11 is a graph showing the positions of two cams, which are offset to each other, in relation to the rotational position of the shaft, according to one embodiment.

With reference now to FIGS. 11 and 12, the rotational displacement sensor 10 can employ a single or multiple sinusoidal or similarly shaped functions to generate strain in one or more strain sensors. The use of multiple strain sensors, which are operated at different phase angles relative to each other, allows for an angular displacement measurement from 0° to 360° and greater than 360°. As the shaft rotates, the position sensor 10 creates a minimum of two sinusoidal waves or similar functions with a know phase shift. Two of the outputs can be compared and a unique position in the range from 0-360 degrees can be determined and illustrated by the function labeled Norm in FIG. 11. Due to the ability to generate a unique position measurement in the 0-360 degree range, a marker can be set. This marker allows for the counting of revolutions, as each time the shaft rotates past this marker, a counter can be used to measure the total number of revolutions. The direction of rotation can also be determined by comparing the slopes of the two functions at a point of measurement and comparing to the slopes at a previous measurement. The velocity and acceleration of the rotation can also be measured from the rate of change of the angular measurement. The combination or comparison of the strain measurements from two or more strain sensors creates a unique output, which relates to a specific rotational displacement. The rotational displacement can be less than one revolution, one revolution, or more than one revolution including multiple revolutions.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A sensor apparatus comprising:
   a first resilient member positioned near a rod member, wherein the rod member includes a first eccentric member which causes the first resilient member to deflect as the rod member rotates;
   a first strain sensor operatively connected to the first resilient member, wherein the first strain sensor measures the strain in the first resilient member due to the deflections caused by the first eccentric member, wherein the strain relates to a rotational position of the rod member;
   a second resilient member subject to substantially the same temperature as the first resilient member; and
   a second strain sensor operatively connected to the second resilient member, wherein the second strain sensor measures the strain in the resilient member due changes in temperature.

2. The sensor apparatus of claim 1 further comprising:
   a second resilient member positioned near the rod member, wherein the first eccentric member causes the second resilient member to deflect as the rod member rotates; and
   a second strain sensor operatively connected to the second resilient member, wherein the second strain sensor measures the strain in the second resilient member due to the deflections caused by the first eccentric member, wherein the strain relates to a rotational position of the rod member.

3. The sensor apparatus of claim 2 further comprising:
   a third resilient member positioned near the rod member, wherein the first eccentric member causes the third resilient member to deflect as the rod member rotates; and
   a third strain sensor operatively connected to the third resilient member, wherein the third strain sensor measures the strain in the third resilient member due to the deflections caused by the first eccentric member, wherein the strain relates to a rotational position of the rod member.

4. The sensor apparatus of claim 3 further comprising:
a fourth resilient member positioned near the rod member, wherein the first eccentric member causes the fourth resilient member to deflect as the rod member rotates; and
a fourth strain sensor operatively connected to the fourth resilient member, wherein the fourth strain sensor measures the strain in the fourth resilient member due to the deflections caused by the first eccentric member, wherein the strain relates to a rotational position of the rod member.

5. The sensor apparatus of claim 2, wherein the second resilient member is positioned at about a 90° angle to the first resilient member.

6. The sensor apparatus of claim 3, wherein the second resilient member is positioned at about a 60° angle to the first resilient member, and the third resilient member is positioned at about a 60° angle to the second resilient member.

7. The sensor apparatus of claim 3, wherein the second resilient member is positioned at about a 120° angle to the first resilient member, and the third resilient member is positioned at about a 120° angle to the second resilient member.

8. The sensor apparatus of claim 1, wherein the first eccentric member is a swash plate attached to the rod member.

9. The sensor apparatus of claim 1, wherein the first strain sensor is a fiber Bragg grating operatively connected to a fiber Bragg grating interrogator device.

10. The sensor apparatus of claim 1, wherein the first resilient member is a spring.

11. The sensor apparatus of claim 1, wherein the first eccentric member is a cam.

12. The sensor apparatus of claim 1, wherein the rod member is crankshaft and the first eccentric member is a crankpin, and a first end of the first resilient member rotates with the crankpin and a second end of the first resilient member is fixed in relation to the crankshaft.

13. The sensor apparatus of claim 8, wherein the first resilient element oscillates in a substantially linear direction parallel to the axial direction of the rod member.

* * * * *